United States Patent [19]

Minami et al.

[11] Patent Number: 4,568,119
[45] Date of Patent: Feb. 4, 1986

[54] FIXED WINDOW ASSEMBLY FOR A MOTOR VEHICLE

[75] Inventors: Chojiro Minami, Yokohama; Yukiharu Masui, Zama, both of Japan

[73] Assignee: Nissan Motor Company, Limited, Yokohama, Japan

[21] Appl. No.: 402,767

[22] Filed: Jul. 28, 1982

[30] Foreign Application Priority Data

Jul. 31, 1981 [JP] Japan ................................ 56-121204
Aug. 5, 1981 [JP] Japan ................................ 56-123383

[51] Int. Cl.$^4$ .......................................... B62D 27/02
[52] U.S. Cl. ........................................ 296/93; 52/208
[58] Field of Search .................... 296/93; 52/208, 400, 52/716, 717

[56] References Cited

U.S. PATENT DOCUMENTS

| | | | | |
|---|---|---|---|---|
| 2,218,814 | 10/1940 | Duffy | ........................ | 296/28 |
| 3,434,903 | 3/1969 | Hann | ........................ | 296/93 X |
| 3,474,586 | 10/1969 | Hoverman | ........................ | 52/400 |
| 3,968,612 | 7/1976 | Endo et al. | ........................ | 52/400 |
| 4,235,056 | 11/1980 | Griffin | ........................ | 52/208 X |
| 4,405,175 | 9/1983 | Hoffman | ........................ | 52/208 X |

FOREIGN PATENT DOCUMENTS

| | | | |
|---|---|---|---|
| 2609498 | 9/1977 | Fed. Rep. of Germany . | |
| 1137770 | 12/1968 | United Kingdom | ........... 296/93 |
| 1348981 | 3/1974 | United Kingdom | ........... 296/93 |
| 2063979 | 6/1981 | United Kingdom . | |

Primary Examiner—Robert B. Reeves
Assistant Examiner—Russell D. Stormer
Attorney, Agent, or Firm—Schwartz, Jeffery, Schwaab, Mack, Blumenthal & Evans

[57] ABSTRACT

A fixed window assembly for a motor vehicle is disclosed which includes an elastic weatherstrip for installing a window pane into a window frame defining a window opening. The weatherstrip has a lip sealingly contacting the outer vehicle body surface adjacent to the window frame. The sealing effect of the sealing lip is enhanced by an elastic sealing band which surrounds the circumference of the sealing lip and has an adhesive tape for adhering the sealing band to the outer vehicle body surface.

8 Claims, 11 Drawing Figures

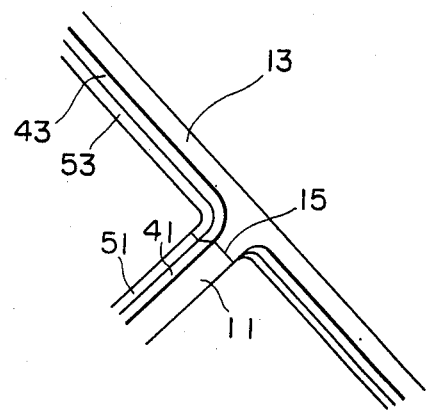
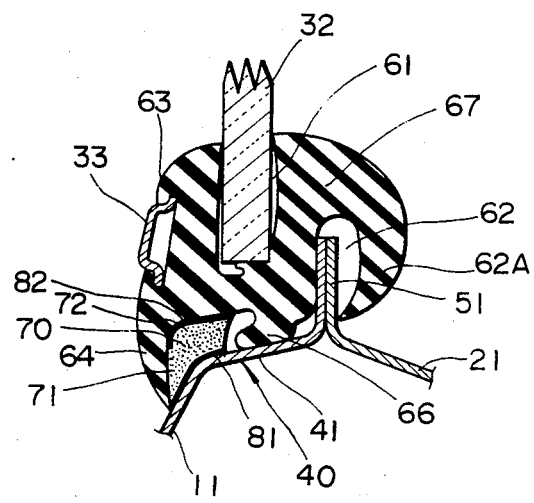
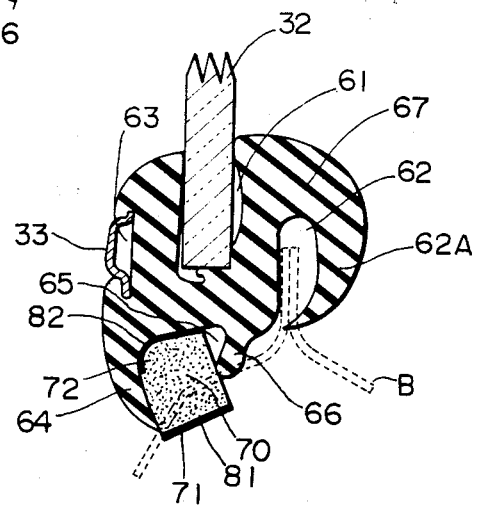

FIXED WINDOW ASSEMBLY FOR A MOTOR VEHICLE

BACKGROUND OF THE INVENTION

1. Field of the Invention

This invention relates to a fixed window assembly for a motor vehicle, such as a windshield assembly or a rear window assembly, and more particularly to a sealing structure between a weatherstrip and outer wall panels of a motor vehicle.

2. Description of the Prior Art

A weatherstrip is widely used to mount a fixedly installed widow pane, such as a windshield pane or a rear window pane, to a window frame of a motor vehicle. A window pane is combined with a weatherstrip by inserting its peripheral edge portion into an inner retaining groove formed in the weatherstrip.

The window pane with the weatherstrip is fixedly installed to a window frame of a motor vehicle by engagement of an outer groove formed in the weatherstrip with a flange extending radially inwardly from the window frame. The weatherstrip has a sealing lip extending radially outwardly of the window frame and sealingly contacting at its peripheral edge portion with the outer surfaces of outer wall panels adjacent to the window frame. As a practical matter, the outer panel surfaces in sealing contact with the lip are not smooth enough to completely seal and prevent the rain water from entering into the interior of the motor vehicle, and so sealant is often used to enhance the sealing effect between the sealing lip of the weatherstrip and the outer panel surfaces of the motor vehicle.

After the installation of the combined window pane and the weatherstrip to the window frame of the motor vehicle, the sealing lip is bent away from the outer wall panels and the sealant is supplied from a nozzle, so as to fill the space between the sealing lip and the outer wall panel surfaces.

However, it is difficult to supply the sealant suitably between the sealing lip and the outer wall panel surfaces, because the head of the nozzle essentially cannot be observed when under the sealing lip and supply of sealant must be done by a worker's perception.

Supplying too little or even an unequal supply of the sealant causes insufficient sealing effect, and the oversupplying of the sealant causes overflow thereof to the outer wall panel surfaces, out of the sealing lip, and it mars the beauty of the outer wall panel surfaces.

Furthermore, the nozzle may leave scratches on the outer wall panel surfaces during the supplying work, and the scratches mar the beauty of the outer wall panel surfaces and cause rust therein.

SUMMARY OF THE INVENTION

It is, therefore, an object of the present invention to provide an improved fixed window assembly for a motor vehicle.

It is also an object of the present invention to provide such a fixed window assembly which can achieve a sufficient sealing efffect between the weatherstrip and the outer wall panel surfaces of the motor vehicle without using sealant.

The objects of the present invention have been accomplished by providing a fixed window assembly in which the weatherstrip has an elastic sealing band means surrounding the circumference of the sealing lip and having an adhesive layer therearound.

In its broad aspects, the present invention comprises a fixed window assembly for a motor vehicle which includes a vehicle body having a window frame defining a window opening, an outer body surface adjacent to the window frame, and a flange extending inwardly from the window frame. Also included is an elastic weatherstrip having a first groove for engaging an edge portion of a window pane, a second groove for engaging the flange, a sealing lip means for sealingly contacting the outer body surface, an elastic sealing band means for sealingly engaging and surrounding the circumference of the sealing lip means and being pressed against the outer body surface when the window pane is installed into the window frame, and an adhesive layer, preferably an adhesive tape attached on the sealing band means for adhering the sealing band to the outer body surface.

By virtue of the present invention, simultaneously with the installation of the window pane to the window frame, the adhesive tape sticks to the outer body surface due to the elasticity of the sealing band, and the space between the weatherstrip and the outer body surface is reliably sealed.

Further objects, features and advantages of the present invention will become apparent from the detailed description of preferred embodiments which follows, when considered together with the attached figures of drawing.

BRIEF DESCRIPTION OF THE DRAWINGS

FIG. 3 is an enlarged view of a corner of the window opening in FIG. 2;

FIG. 4 is a view similar to FIG. 1, but illustrating a preferred embodiment of a rear window assembly according to the present invention;

FIG. 5 is a sectional view of a weatherstrip with a rear window pane shown in FIG. 4, but in unmounted disposition;

DETAILED DESCRIPTION OF PREFERRED EMBODIMENTS

Figure 1:
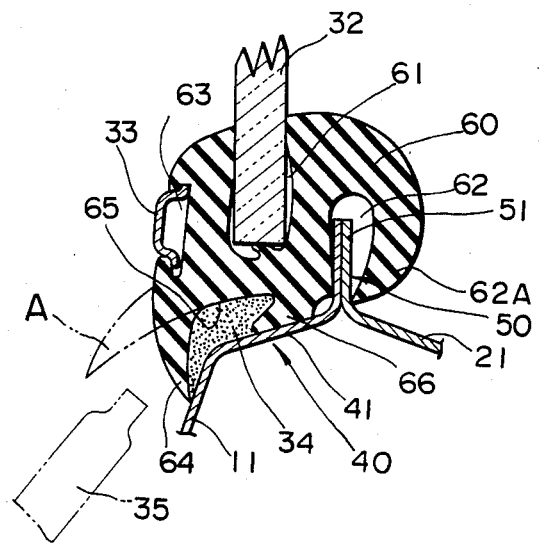
FIG. 1 is a sectional view of the sealing edge position of a rear window assembly of a motor vehicle, illustrating a prior art assembly.

Referring to FIG. 1, FIG. 2, FIG. 2A, and FIG. 3, an outer rear waist panel 11 and an inner rear waist panel 21 of a vehicle body 30 are bent toward and joined with each other by spot welding, for example, to provide a lower frame portion 41 and lower flange portion 51. An outer roof panel 12 and inner roof panel 22 are similarly joined to provide an upper window frame portion 42 and an upper flange portion 52.

Also, outer rear side panels 13, 14 and inner rear side panels (not shown) are similarly joined to provide side frame portions 43, 44 and side flange portions 53, 54 respectively.

The lower and upper frame portions 41, 42 are joined together at both ends with side frame portions 43, 44 to provide a closed loop window frame 40 defining a window opening 31, and the lower and upper flanges 51, 52 are similarly joined with side flanges 53, 54 to provide a closed loop mounting flange 50 for a weatherstrip 60, usually made of rubber. A rear window pane 32 is combined with the weatherstrip 60 by inserting its peripheral edge portion into an inner retaining groove 61 formed in the weatherstrip 60. The window pane 32 combined with the weatherstrip 60 is fixedly installed to the window frame 40 by engagement of an outer groove 62 surrounded by the holding lip 62A. The weatherstrip 60 has a narrow channel portion 63 in the outer surface thereof to secure an ornamental molding strip 33, and has a sealing lip 64 extending radially outwardly of the window frame 40 from the channel portion 63 and sealingly contacting at its free end or peripheral edge portion with the outer surfaces of the outer wall panels 11-14 adjacent to the window frame 40.

In order to enhance the sealing effect between the sealing lip 64 and the outer wall panel surfaces 11-14, sealant 34 is filled in a groove-like space 65 surrounded by the sealing lip 64, an inner lip 66 formed in the weatherstrip 60 adjacent to the flange 50, and the outer wall panel surfaces 11-14.

After the installation of the window pane 32 with the weatherstrip 60 to the window frame 40, the sealing lip 64 is bent away from the outer wall panels as shown by phantom line A in FIG. 1, and the sealant is supplied from a nozzle 35 so as to fill the space 65.

With this prior art arrangement, as explained before, it is difficult to supply the sealant 34 suitably between the sealing lip 64 and the outer wall panel surfaces 11-14, because the head of the nozzle 35 is not easily visible under the sealing lip 64, and supplying sealant must be done by a worker's perception. Too small an amount or unequal supply of the sealant 34 causes an insufficient sealing effect, and the oversupplying of the sealant 34 causes overflow thereof to the outer wall panel surfaces 11-14, out of the sealing lip 64, and it mars the beauty of the outer wall panel surfaces 11-14.

Furthermore, the nozzle 35 may leave scratches on the outer wall panel surfaces 11-14 during the supplying work, and the scratches mar the beauty of the outer wall panel surfaces 11-14 and cause rust therein.

Figure 2:
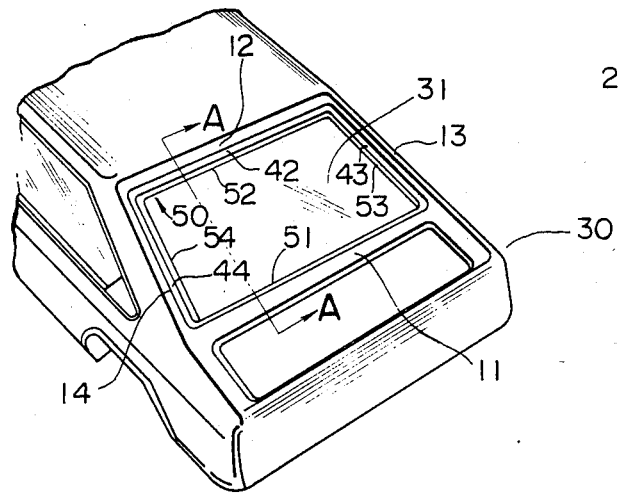
FIG. 2 is a perspective view of a motor vehicle, illustrating a rear body portion without a rear window assembly.
Figure 2A:
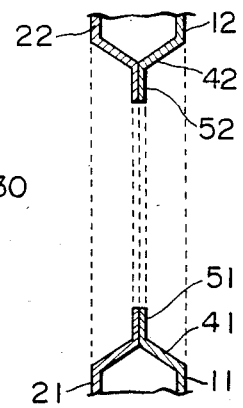
FIG. 2A is a cross-section along line A—A in FIG. 2.

Referring now to FIGS. 4-6, the same reference numerals as in FIGS. 1-3 are employed to designate corresponding parts. FIG. 5 illustrates a preferred embodiment of a weatherstrip with a window pane according to the present invention, before its installation in a window frame of a motor vehicle.

The weatherstrip 67 in FIG. 5 is basically the same as the weatherstrip 60 illustrated in FIG. 1, but has a closed loop sealing band 70 fitted in its groove-like portion 65 surrounded by the sealing lip 64 and the inside lip 66.

Figure 6A:
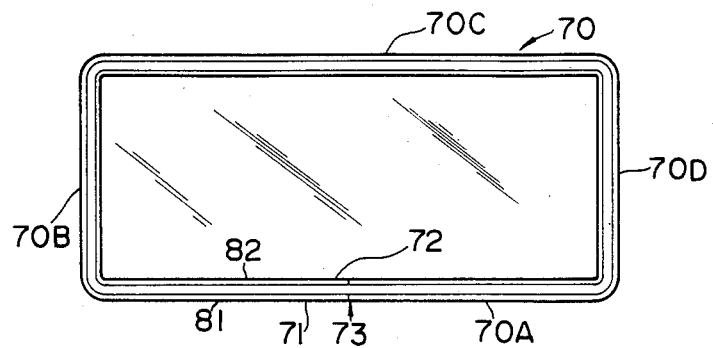
FIGS. 6A and 6B are front views of a sealing band shown in FIGS. 4 and 5.

The sealing band 70 is made of easily compressible rubber, such as foamed rubber. In its free position, as shown in FIG. 6A, the sealing band 70 is made in a similar circumferential shape to the weatherstrip 67, and the cross-section of the sealing band 70 is rectangular, that is, the outer and inner surfaces 71, 72 thereof are made flat, as shown in FIG. 5.

On these flat surfaces 71, 72, two-sided adhesive tapes 81, 82, which are butyl or acrylic adhesive tapes, for example, are attached over the entire inner and outer circumferences.

A roll of tape, where one side of a two-sided adhesive tape is covered by an easily peelable covering which prevents the side from sticking to undesirable places, can be used to attach the tapes 81, 82 onto the surfaces 71, 72. For example, to attached the outer adhesive tape 81 to the outer surface 71, the end of the tape from the roll of tape is secured to the center of the lower edge 73 of the sealing band 70, and the entire circumference of the outer surface is covered. Then, the tape is cut from the roll so as to make both ends of the tape 81 meet at the center of the lower edge 73. The inner adhesive tape 82 an be attached to the inner surface 72 similarly. The lower edge 73 of the sealing band 70 is the best place to make both ends of the tape meet, because the rain water is most unlikely to enter therefrom into the interior of the motor vehicle.

Figure 6B:
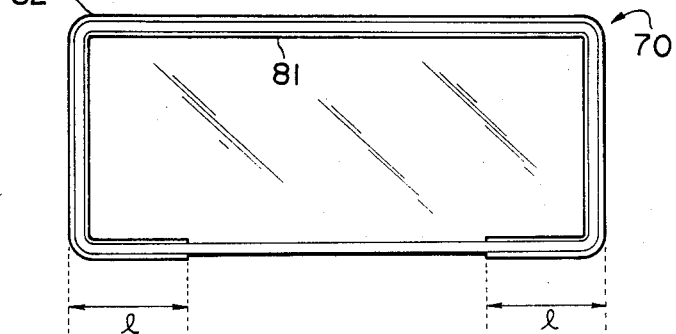

Practically speaking, the lower edge 73 of the sealing band 70 need not be entirely covered by the tapes 81, 82. As shown in FIG. 6B, only the right and left side of the lower edge 73, over the same length L from each corner, may be covered by the tapes 81, 82.

It has been experimentally determined that 10 centimeters is enough length L to prevent rain water from entering into the interior of the motor vehicle.

The sealing band 70, as shown in FIG. 6A or 6B, is fitted in the groove-like portion 65 of the weatherstrip 67 as shown in FIG. 5, after the covering on the inner adhesive tape 82 is peeled off. The inner size of the sealing band 70 is made a little bit smaller than that of the groove-like portion 65, so that the inner adhesive tape 82 can receive enough pressure from the sealing band 70 to stick to the surface of the groove-like portion 65.

On the other hand, the outer surface 71 of the sealing band 70 extends beyond the dotted line B in FIG. 5, which shows the wall panel surfaces adjacent to the window frame, so that the outer adhesive tapes 81 can receive enough pressure from the sealing band 70 to stick to the outer surfaces of the outer wall panels, when the window pane 32 with the weatherstrip 67 is installed into the window frame.

The installation of the window pane 32 with the weatherstrip 67, as shown in FIG. 5, can be described as follows, with reference to FIG. 4.

First, a volatile lubricant for the adhesive tape 81, for example, neutral detergent solution for an acrylic adhesive tape, is painted all over the outer surfaces of outer wall panels 11-14 adjacent to the rear window frame 40, in order to prevent the adhesive tape 81 from sticking to unsuitable areas.

After the covering on the adhesive tape 81 is peeled off, the rear window pane 32 with the weatherstrip 67 is brought into the rear window frame 40.

By means of an assembly string or rope inserted in the outer groove 62, the holding lip 62a of the weatherstrip 67 is pulled over the flange 50. The window pane 32 with the weatherstrip 67 is then pressed against the flange 50, and the holding lip 62a is turned over the flange 50 into its normal position for the secure seating.

At the same time, the sealing band 70 is compressed between the weatherstrip 67 and the outer wall panels 11-14, and the adhesive tape 81 can receive enough pressure to stick to the surfaces of the outer wall panels 11–14. The lubricant under the adhesive tape 81, if any, does not prevent the adhesive tape 81 from sticking to the surfaces after its volatilization. Another simple way for the installation of the window pane 32 without using the lubricant is as follows.

First, the window pane 32 with the weatherstrip 67 is brought into the frame 40, and the holding strip 62a of the weatherstrip 67 is pulled over the flange 50 in a similar manner as mentioned above. Next, the covering on the adhesive tape 81 is peeled off. The window pane 32 with the weatherstrip 67 is then pressed against the flange 50, and the holding lip 62a is turned over the flange 50 into its normal position for the secure seating. At the same time, the sealing band 70 is compressed between the weatherstrip 67 and the outer wall panels 11–14, and the adhesive tape 81 can receive enough pressure to stick to the surface of the outer wall panels 11–14.

Thus, simultaneously with the installation of the window pane, the space between the weatherstrip 67 and the outer wall panels 11–14 is sealed over the entire circumference by the sealing band 70 with the two-sided adhesive tapes 81, 82 as shown in FIG. 4.

According to the present invention, a discrepancy in the tolerance of the outer wall panels 11–14 or the weatherstrip 67 does not greatly affect the sealing ability of the weatherstrip 67, because the sealing band 70 is easily transformed in accordance with the shape of the outer wall panels 11–14 or the weathestrip 67.

Furthermore, the present invention has another advantage. As shown in FIG. 3, there is a discontinuous portion 15 around the corner of the window frame 40, where the rear waist panels 11, 21 and the rear side panels 13, 23 are joined. According to the prior art which uses the sealant as mentioned before, the discontinuous portion 15 needs soldering and grinding, which require a lot of time and cost, to obtain the flat and continuous surface for secure sealing.

However, according to the present invention, the discontinuous portion 15 may be left without soldering and grinding, because the sealing band 70 and the adhesive tape 81 are transformed in accordance with the shape of the discontinuous portion 15 and securely seal the space between the weatherstrip 67 and the outer wall panels 11–14.

Figure 7:
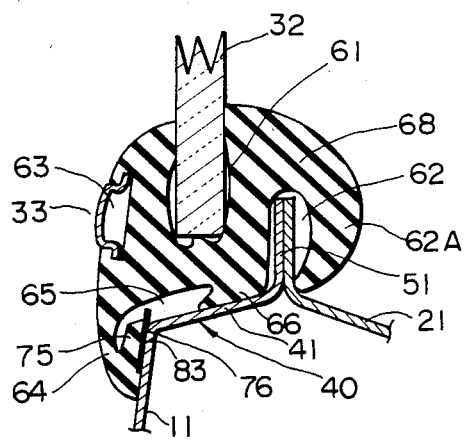
FIG. 7 is a view similar to FIG. 1, but illustrating another preferred embodiment of a rear window assembly according to the present invention.
Figure 8:
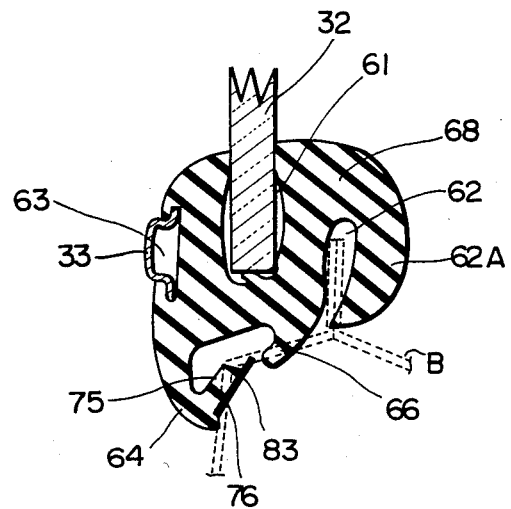
FIG. 8 is a sectional view of a weatherstrip with a rear window pane shown in FIG. 7, but in ummounted disposition.

FIGS. 7 and 8 illustrate another preferred embodiment according to the present invention. Referring to FIG. 7, the weatherstrip 68 is basically the same as the weatherstrip 60 as shown in FIG. 1, but has a lip-like sealing band 75 which is integrated with the weatherstrip 68 over the entire circumference. The sealing band 75 extends inwardly from the inside of the tip or free end of the sealing lip 64 into the groove-like space 65. On the outer surface or lateral face portion 76 of the sealing band 75, a two-sided adhesive tape 83 is attached in a similar manner as described before.

In order to attach the tape 83 securely around each corner, it is necessary to leave some pleats in the tape 83 to conform with the curvature of each corner. The outer surface 76 of the sealing band 75 goes beyond the dotted line B in FIG. 8, which shows the wall panel surfaces adjacent to the window frame, so that the tape 83 can receive enough pressure from the sealing band 75 to stick to the outer surfaces of the outer wall panels. The window pane 32 with the weatherstrip 68 is installed in a similar manner as described before. Simultaneously with the installation, the lateral face portion 76 of sealing band 75 is pressed against the outer wall panels 11–14 and transformed like a cantilever which is supported at the tip of the sealing lip 64, and the adhesive tape 83 can receive enough pressure to stick to the outer surfaces of the outer wall panels 11–14 as shown in FIG. 7.

Thus, the space between the sealing lip and the outer wall panels is sealed over the entire circumference by the sealing band 75 with the two-sided adhesive tape 83.

Figure 9:
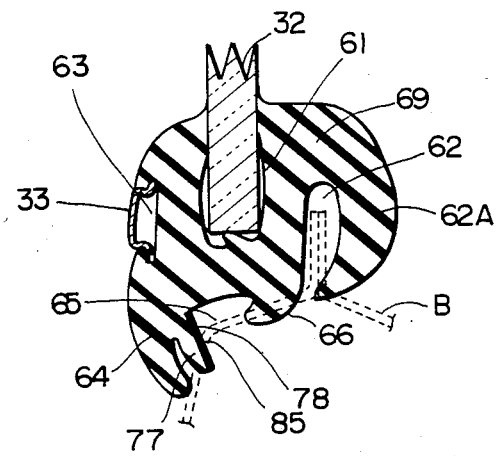
FIG. 9 is a view similar to FIG. 8, but illustrating yet another preferred embodiment of a rear window assembly according to the present invention.

FIG. 9 illustrates yet another preferred embodiment according to the present invention. As shown in FIG. 9, the weatherstrip 69 has the lip-like sealing band 77 which is integrated with the weatherstrip 69 over the entire circumference but extends outwardly, that is, in the same direction as the sealing lip 64 from the base portion of the sealing lip 64 into the groove-like space 65. On the outer surface or lateral face portion 78 of the sealing band 77, the two-sided adhesive tape 85 is attached in a similar manner as described before. The outer surface 78 of the sealing band 77 goes beyond the dotted line B, which shows the wall panel surfaces adjacent to the window frame so that the tape 85 can receive enough pressure to stick to the outer surfaces of the outer wall panels. The window pane 32 with the weatherstrip 69 is installed in a similar manner as described before. Simultaneously with the installation, the face portion 76 of sealing band 77 is pressed againat the outer wall panels 11–14 and transformed like a cantilever which is supported at the base portion of the sealing lip 64, and the two-sided adhesive tape 85 can receive enough pressure to stick to the outer surfaces of outer wall panels 11–14. After the installation, the sealing band 77 is completely covered by the sealing lip 64. Thus, the space between the sealing lip 64 and the outer wall panels 11–14 is sealed over the entire circumference by the sealing band 77 with the two-sided adhesive tape 85.

From the above, it is apparent that although the present invention has been described hereinbefore with respect to certain specific embodiments thereof, it is evident that many modifications and changes may be made without departing from the spirit of the invention.

What is claimed is:

1. A fixed window assembly for a motor vehicle comprising:
    (a) a vehicle body having a window frame defining a window opening, an outer body surface exposed outwardly of the vehicle and terminating in and merging into said window frame, and a flange extending inwardly from said window frame with respect to said window opening;
    (b) a window pane mounted in said window opening; and
    (c) an elastic weatherstrip surrounding said window pane and having a first groove for receiving an edge portion of said window pane, a second groove for receiving said flange, a resilient first sealing lip resiliently and sealingly contacting said outer body surface, an elastic sealing band means comprising a second resilient lip integrally formed on a portion of said first lip surrounding the circumference of said first sealing lip and having a mating lateral face portion matingly pressed against said outer body surface, and an adhesive tape attached to said mating lateral face of said sealing band means for adhering the sealing band means to said outer surface, said adhesive tape being elastically biased toward said outer body surface by means of an elastic force provided by said first and second resilient sealing lips.

2. A fixed window assembly according to claim 1, wherein the adhesive tape is attached on said sealing band means so that both ends of the tape meet and are located along the lower edge of said window frame.

3. A fixed window assembly according to claim 1, wherein said first sealing lip is integrally formed with a major portion of the weatherstrip including said first and second grooves, said first sealing lip extending over a portion of said outer body surface located adjacent said window frame and having a free end elastically biased toward said outer body surface.

4. A fixed window assembly according to claim 3, wherein the elastic sealing band means comprises a lip extending toward said vehicle body from a tip of said first sealing lip.

5. A fixed window assembly according to claim 3, wherein the elastic sealing band means comprises a lip extending outwardly from a base portion of said first sealing lip.

6. A weatherstrip for mounting a fixedly installed window pane for a motor vehicle which has a body having a window frame, an outer body surface terminating in and merging into said window frame, and a flange extending inwardly from said window frame, said weatherstrip comprising:
  (a) an elastic strip for surrounding the window pane, said elastic strip having a first groove formed therein for receiving an edge portion of the window pane and a second groove formed therein for receiving the flange;
  (b) a first sealing lip formed integrally with said elastic strip and having a free end portion and normally biased toward said outer body surface for sealingly contacting the free end portion thereof to the outer body surface;
  (c) an elastic sealing band means comprising a second resilient lip integrally formed on a portion of said first lip surrounding the circumference of said first sealing lip and having a mating lateral face matingly pressed against the outer body surface when the window pane is mounted in the window frame; and
  (d) an adhesive tape interposed between said elastic sealing band means and said outer body surface for adhering the sealing band means to the outer body surface so as to establish a seal therebetween.

7. A sealing structure for a fixed window assembly of an automotive vehicle comprising:
  a vehicle body defining therein a window opening for receiving a window pane, said vehicle body having an outer body surface portion which terminates adjacent said window opening;
  a weatherstrip inserted between the periphery of said window opening and the circumferential edge portion of said window pane, said weatherstrip being engageable to both of said periphery of the window opening and said circumferential edge of said window pane for establishing a seal therebetween;
  a first lip portion extending from a major portion of said weatherstrip and over said outer body surface portion, said first lip portion being biased toward said outer body surface portion for establishing elastic contacting engagement therebetween;
  a second lip portion formed integrally on said first lip portion and having a face portion opposing said outer body surface and resiliently mating to the latter for establishing elastic contacting engagement therebetween; and
  an adhesive tape interposed between said face portion of said second lip portion and said outer body surface portion for sealingly adhering said second lip portion to said outer body surface portion.

8. A sealing structure according to claim 7, wherein said adhesive is located relative to said face portion so that it receives elastic biasing force toward said outer body surface for forming a uniform seal around said fixed window.

* * * * *